United States Patent
Goicea et al.

(10) Patent No.: US 7,856,630 B2
(45) Date of Patent: Dec. 21, 2010

(54) SYSTEM, METHOD AND PROGRAM TO MANAGE PROGRAM UPDATES

(75) Inventors: Flaviu I. Goicea, Poughkeepsie, NY (US); Jamye R. J. Hansen, Firestone, CO (US)

(73) Assignee: International Business Machines Corporation, Armonk, NY (US)

( * ) Notice: Subject to any disclaimer, the term of this patent is extended or adjusted under 35 U.S.C. 154(b) by 1324 days.

(21) Appl. No.: 11/326,421

(22) Filed: Jan. 5, 2006

(65) Prior Publication Data
US 2007/0157196 A1 Jul. 5, 2007

(51) Int. Cl.
G06F 9/44 (2006.01)
G06F 9/445 (2006.01)
(52) U.S. Cl. .......... 717/170; 717/121; 717/175
(58) Field of Classification Search ............ None
See application file for complete search history.

(56) References Cited

U.S. PATENT DOCUMENTS

| | | | | |
|---|---|---|---|---|
| 6,763,327 | B1 * | 7/2004 | Songer et al. | 703/21 |
| 6,804,774 | B1 * | 10/2004 | Larvoire et al. | 713/2 |
| 7,000,229 | B2 * | 2/2006 | Gere | 717/169 |
| 7,237,238 | B2 * | 6/2007 | Peppers et al. | 717/170 |
| 2004/0221146 | A1 * | 11/2004 | Baumann | 713/1 |
| 2005/0027831 | A1 * | 2/2005 | Anderson et al. | 709/220 |
| 2005/0034118 | A1 * | 2/2005 | Raman et al. | 717/174 |
| 2006/0031425 | A1 * | 2/2006 | Nelson et al. | 709/220 |
| 2006/0195836 | A1 * | 8/2006 | Lu et al. | 717/170 |

OTHER PUBLICATIONS

"How to force a Hardware Abstraction Layer during an upgrade or an installation of Windows XP", Jun. 4, 2004, Microsoft.com (accessed Mar. 25, 2009) <http://support.microsoft.com/kb/299340>.*
"A dynamic operating system for sensor nodes", Han et al., Jun. 2005, pp. 163-176, <http://delivery.acm.org/10.1145/1070000/1067188/p163-han.pdf>.*
"Partitioning based operating system: a formal model", Luo et al., Jul. 2003, pp. 23-35, <http://delivery.acm.org/10.1145/890000/881787/p23-luo.pdf>.*

(Continued)

*Primary Examiner*—Thuy Dao
(74) *Attorney, Agent, or Firm*—Arthur J. Samodovitz

(57) ABSTRACT

System, method and program for installing a first operating system, including a first hardware abstraction layer and other operating system functions, into a client computer. An image of the other operating system functions and a second hardware abstraction layer is loaded into the client computer. The second hardware abstraction layer is functionally interrelated with the second hardware abstraction layer in the image. There is automatic detection that the second hardware abstraction layer loaded into the client computer is incompatible with the client computer. In response, the second hardware abstraction layer with the first hardware abstraction layer is automatically replaced in the client computer. Subsequently, the first operating system including the first hardware abstraction layer and the other operating systems functions is booted up in the client computer. In one example, the operating system is Windows XP, the first hardware abstraction layer is adapted for an ACPI PIC type client computer, and the second hardware abstraction layer is adapted for an ACPI APIC type client computer.

15 Claims, 2 Drawing Sheets

OTHER PUBLICATIONS

"Extensible distributed operating system for reliable control systems", Maruyama et al., Jul. 2002, pp. 194-197, <http://delivery.acm.org/10.1145/1140000/1133412/p194-maruyama.pdf>.*

Powerquest Corporation, "PowerQuest® Deploy Center 5.5 User Guide," Published Jun. 2003.

Powerquest Corporation, "PowerQuest® Deploy Toolkit 2.52 User Guide," Published Jun. 2003.

Powerquest Corporation, "PowerQuest® PartitionMagic® 8.0 User Guide," Published Sep. 2002.

SAMS, "Troubleshooting and Configuring the NT/95 Registry", Copyright May 1997.

* cited by examiner

SYSTEM, METHOD AND PROGRAM TO MANAGE PROGRAM UPDATES

FIELD OF THE INVENTION

The invention relates generally to computer systems, and more specifically to installation of an operating system in a client computer from an image of the operating system.

BACKGROUND OF THE INVENTION

Operating systems such as Microsoft™ Windows 2000™, Microsoft ™ Windows XP™, etc. are well known today. Different types of client computers may require different Hardware Abstraction Layer ("HAL") programs for otherwise the same operating system. The reason is that the Hardware Abstraction Layer is an interface between the operating system kernel and the client computer hardware and microcode, and interacts with the client computer hardware and microcode. Therefore, each type of client computer needs a HAL program which is specific to the type of client computer hardware and microcode. In general, a known HAL program comprises programming to perform the following functions:
  Controls I/O interfaces and provides a uniform I/O interface model to drivers;
  Controls interrupts;
  Manages multiple processors;
  Isolates other portions of the operating system, such as the kernel, from hardware specific details, to facilitate a uniform computing environment.

If the client computer has an older Programmable Interrupt Controller ("PIC") (i.e. an interrupt controller device capable of managing fifteen interrupt request lines), one form of HAL will be needed to interact with the associated client computer hardware and microcode. However, if the client computer has a newer Advanced Programmable Interrupt Controller ("APIC") (i.e. an enhanced interrupt controller device capable of managing twenty four or more interrupt request lines and supporting hyperthreading and multiprocessor multi-core systems), a different form of the proper HAL will be needed to interact with the associated client computer hardware and microcode. Consequently, a "build" server or build media (responsible for facilitating the installation of the operating system into client computers) needs two different "images" of the operating system to perform the installations, one to deploy the operating system to PIC computers and another to deploy the operating system to APIC computers.

An installation program can load the operating system (including its HAL program) and associated drivers, utilities and applications via the Internet, a Local Area Network, or from optical media to the target client computer. There are known program tools executable in the client computer to automate the installation, such as IBM Standard Client Installer ("ISCI") program, PowerQuest DeployCenter program and Wilson WindowWare Winbatch scripting language compiled executables. In summary, the known ISCI program operates as follows:

For a network assisted build of the operating system in the client computer, an operator inserts ISCI boot media into the client computer, and the ISCI program begins processing. ISCI then determines the closest "build server" using an intelligent routing algorithm. ISCI then checks the client computer to ensure it is compatible with at least one of the operating system releases stored on the build server. If this check passes, ISCI proceeds as follows. A PowerQuest PartitionMagic program tool obtains free space on the hard drive and creates a temporary File Allocation Table ("FAT") partition called "staging" on the hard drive. Then, ISCI downloads the operating system image from the build server directly to the staging partition on the hard drive. The ISCI also downloads a PowerQuest DeployCenter program into the staging partition. Then ISCI invokes the DeployCenter program to write and restore the operating system image to the free space on the hard drive. "Restore" means to extract the data and program files from the image, reformat the data and program files and convert them to a bootable form. This creates a New Technology File System ("NTFS") partition on the hard drive, containing the operating system in a bootable form. ISCI also requests download of additional drivers and support utilities to the temporary partition on the client computer, if needed. ISCI determines which utilities and drivers the client needs by examining a file called mtb.ini, which lists configuration information for each client computer. ISCI then copies the drivers from the temporary partition into the operating system partition using the PowerQuest PQAccess.exe tool, needed for writing to NTFS type partitions from outside a Windows operating system. ISCI also delivers support programs into the temporary partition that allow the operating system, such as Windows XP, to automatically modify system settings, install utilities and applications, etc., after ISCI relinquishes control and the operating system first boots on the client computer. The temporary partition is deleted at the end of the build process.

For a non-network assisted build of the operating system in the client computer, an operator inserts the ISCI boot media into the client computer, and the ISCI program begins processing. The boot media may be either a diskette or optical media (CD or DVD). For an optical media build, ISCI performs the same functions as above, except all programs and data that would be downloaded from a build server for a network assisted build are instead copied from optical media. In addition to the operating system, the installation program can automatically install the associated drivers, utilities and applications to the client computer.

If the known installation program needs to install the Windows XP operating system into different types of client computers, such as both ACPI APIC and ACPI PIC computers, then the known installation program needs two "images" of the Windows XP operating system, one with the HAL for ACPI APIC and another with the HAL for ACPI PIC.

For each different image of the operating system that is needed in the build server or media, there are associated management and administrative costs, such as the cost of disk storage and the effort required to keep each operating system image consistent with updates.

A known Microsoft Sysprep program tool can perform a highly limited and constrained form of HAL modification on a target computer. For example, it can accommodate the change from a Uniprocessor version of the ACPI PIC HAL to a Multiprocessor version of the same ACPI PIC HAL, but it cannot change the core HAL type completely, and therefore does not avoid the need to create and maintain multiple operating system images. For more information on the Sysprep tool, the "Running Sysprep" section of publicly available Microsoft Windows XP Resource Kit Documentation can be consulted. This document is available both online and in print form (ISBN 0735614857), and the "Running Sysprep" section is hereby incorporated by reference as part of the present disclosure.

An object of the present invention is to provide an installation program which can install an operating system into different types of client computers requiring different HAL programs, such as both ACPI APIC and ACPI PIC computers, from a single image of the operating system in the build server or build media.

A more specific object of the present invention is to provide an installation program which can install a Windows XP operating system into both ACPI APIC and ACPI PIC computers, from a single image of the Windows XP operating system on the build server or media.

SUMMARY OF THE INVENTION

The present invention resides in a system, method and program for installing a first operating system, including a first hardware abstraction layer and other operating system functions, into a client computer. An image of the other operating system functions and a second hardware abstraction layer is loaded into the client computer. The second hardware abstraction layer is functionally interrelated with the second hardware abstraction layer in the image. There is automatic detection that the second hardware abstraction layer loaded into the client computer is incompatible with the client computer. In response, the second hardware abstraction layer with the first hardware abstraction layer is automatically replaced in the client computer. Subsequently, the first operating system including the first hardware abstraction layer and the other operating systems functions is booted up in the client computer.

In one example, the operating system is Windows XP, the first hardware abstraction layer is adapted for an ACPI PIC type client computer, and the second hardware abstraction layer is adapted for an ACPI APIC type client computer.

DETAILED DESCRIPTION OF THE PREFERRED EMBODIMENTS

Figure 1:
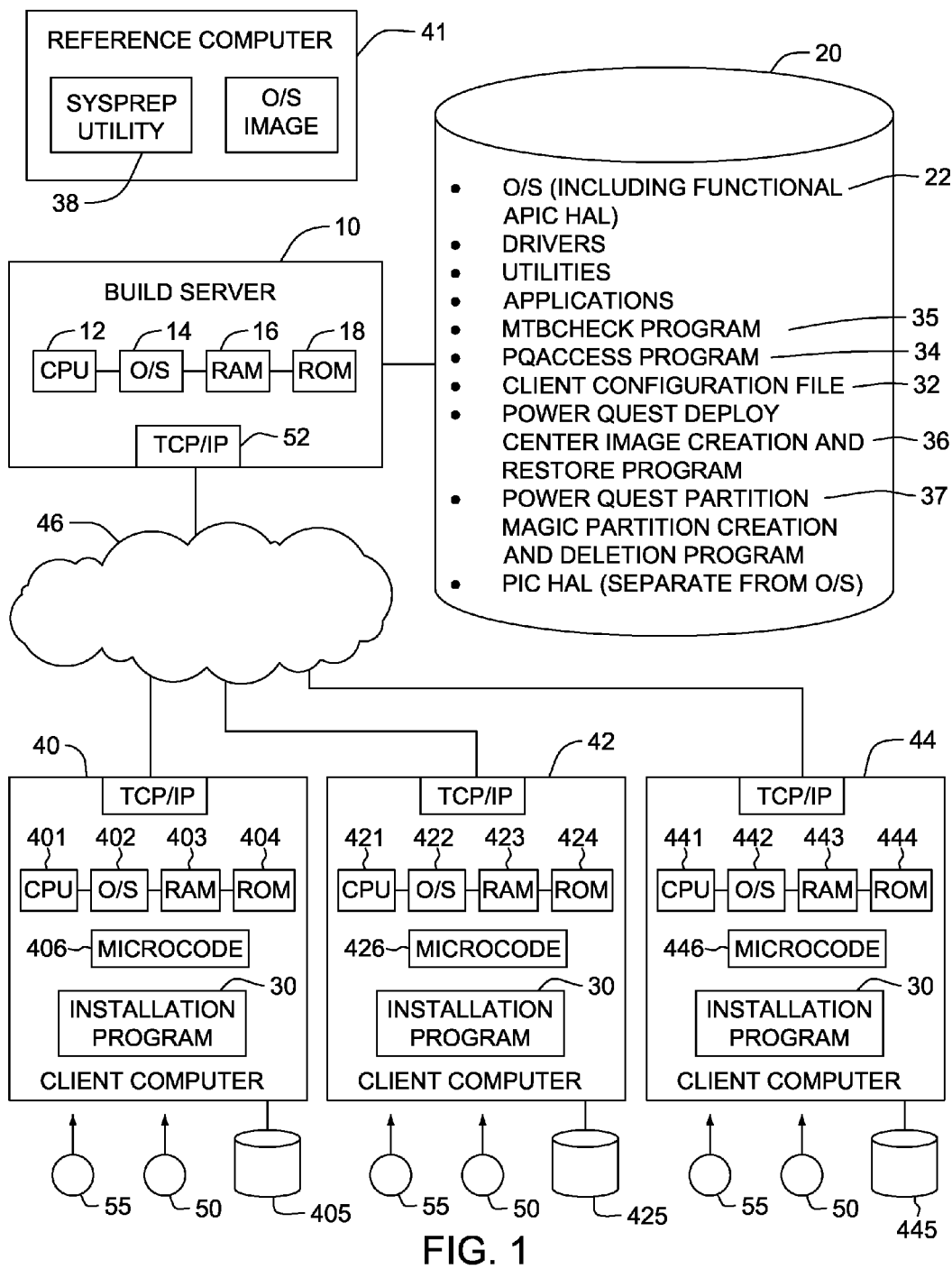
FIG. 1 is a block diagram of a distributed computer system which includes client computers each with an installation program and associated programs according to the present invention.
Figure 2:
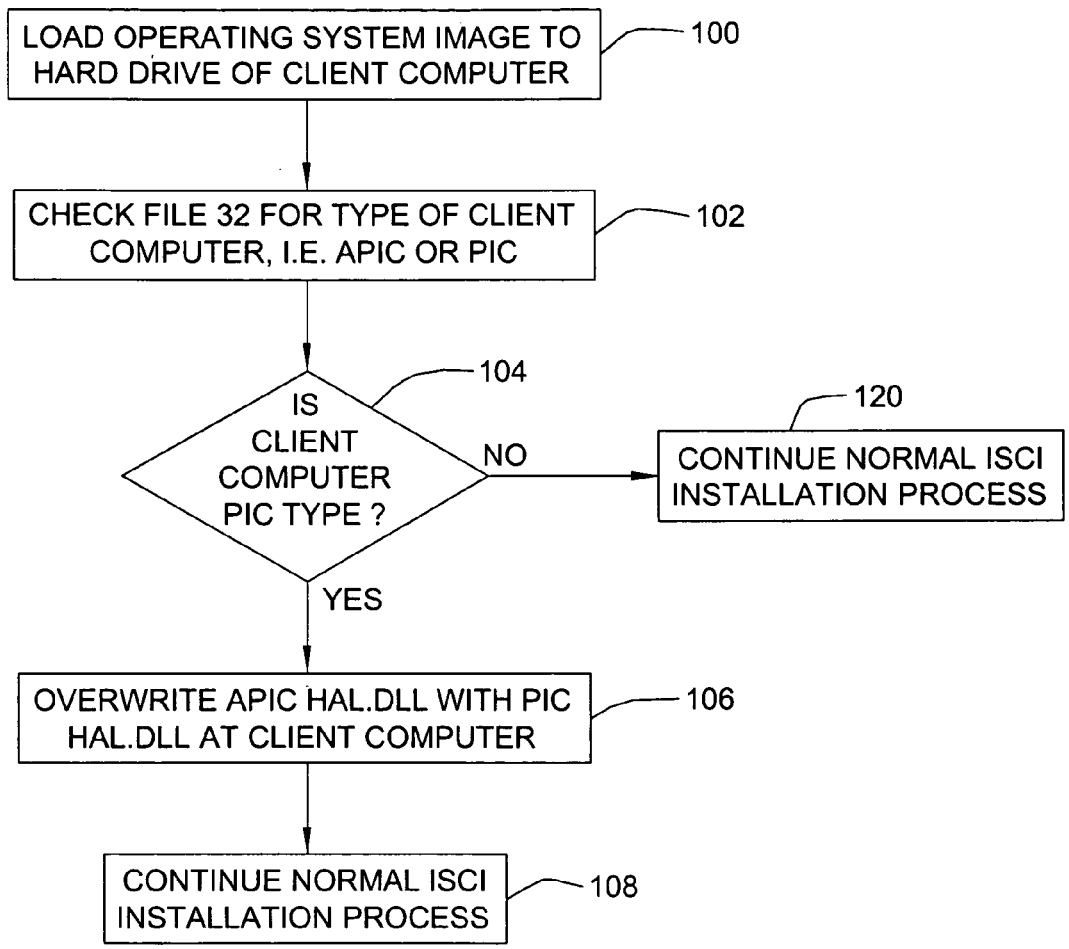
FIG. 2 is a flow chart of the installation program and associated programs of FIG. 1.

The present invention will now be described in detail with reference to the figures. FIG. 1 illustrates a server 10 which includes a known processor 12, operating system 14, RAM 16, and ROM 18. A storage 20 stores an operating system image 22 (including an ACPI APIC HAL program) and associated drivers, utilities and applications for download to clients 40, 42 and 44. Storage 20 also stores an ACPI PIC HAL program, a PQAcess NTFS writing program tool 34, a mtbcheck decision making program 35, an mtb.ini.machine configuration data file 32, a PowerQuest DeployCenter image creation and restore program tool 36 and a PowerQuest PartitionMagic partition creation and deletion program 37 for download to client computers 40, 42 and 44 and use by the client computers in installing the operating system 22 and associated drivers, utilities and applications, according to the present invention. The PQAccess NTFS writing program tool 34 is further described in publication, PowerQuest Deploy Toolkit 2.52 User Guide, published September 2002 by PowerQuest Corp., which publication is hereby incorporated by reference as part of the present disclosure. The PowerQuest DeployCenter image creation and restore program tool 36 is further described in publication, PowerQuest DeployCenter 5.5 User Guide, published June 2003 by PowerQuest Corp., which publication is hereby incorporated by reference as part of the present disclosure. The PowerQuest PartitionMagic program tool 37 is further described in publication, PowerQuest PartitionMagic 8.0 User Guide, published September 2002 by PowerQuest Corp., which publication is hereby incorporated by reference as part of the present disclosure. File 32 lists configuration information, including architecture type (ACPI APIC or ACPI PIC), model, what drivers and utilities need to be installed on the client computer, video resolution, and BIOS version information for each client computer supported by program 30. As explained in more detail below, PQAccess tool or other New Technology File System ("NTFS") file writing tool 34 is used to overwrite one HAL file with another HAL file in a client computer, when appropriate as directed by program 30. (The PQAcess tool was known in the Prior Art, although not to overwrite one HAL file with another HAL file in a client computer, according to the present invention.) As explained in more detail below, PowerQuest DeployCenter program tool 36 restores the proper operating system image (with the ACPI APIC HAL file) in the client computer after program 30 downloads it to the appropriate partition.

Server 10 is coupled to client computers 40, 42 and 44 via a network 46 such as the Internet. By way of example, client computers 40 and 42 are Advanced Configuration and Power Interface ("ACPI") Advanced Programmable Interrupt Controller ("APIC") type computers, and client computer 44 is an Advanced Configuration and Power Interface ("ACPI") Programmable Interrupt Controller ("PIC") type computer. Each of the clients 40, 42, and 44 contains a modified ISCI program or other modified automated installation program 30, which has been modified according to the present invention. The general function of program 30 is to automatically install the operating system images and associated drivers, utilities and applications into client computers when needed, using the foregoing programs 34-37 and file 32 downloaded from storage 20 in server 10. In an alternate embodiment of the present invention, programs 34, 35, 36, 37 and file 32 are loaded into the client computers from an optical or other storage media 55. Client computer 40 includes a CPU 401, operating system 402, computer readable RAM 403, computer readable ROM 404, computer-readable hard-drive storage media 405 and microcode 406. Client computer 42 includes a CPU 421, operating system 422, computer readable RAM 423, computer readable ROM 424, computer-readable hard-drive storage media 425 and microcode 426. Client computer 44 includes a CPU 441, operating system 442, computer readable RAM 443, computer readable ROM 444, computer-readable hard-drive storage media 445 and microcode 446. The programs 30 in client computers 40, 42 and 44 are stored on respective computer-readable hard-drive storage media 405, 425 and 445 for execution by respective CPUs 401, 421 and 441 via respective computer readable memories 403, 423 and 443.

A system preparation utility such as a known Microsoft Sysprep utility program 38 executes on a reference client computer 41 configured as ACPI APIC. An operator previously used program 38 in conjunction with image creation program 36 on computer 41 to create the hard disk image 22 for storage in storage 20 (and subsequent download to client computers 40, 42 and 44 or storage in media 55.) Image 22 is an image (or copy) of an operating system previously installed on an Advanced Configuration and Power Interface ("ACPI") Advanced Programmable Interrupt Controller ("APIC") computer for deployment on other Advanced Configuration and Power Interface ("ACPI") Advanced Programmable Interrupt Controller ("APIC") type client computers.

The image 22 comprises an operating system kernel, utilities, GUI, etc. and a hardware abstraction layer. For example, the image 22 is an image of Microsoft Windows XP operating system, and this hard disk image 22 includes the HAL for ACPI APIC, i.e. an ACPI APIC hal.dll. An operator of server 10 also stored separately on storage 20 the HAL for ACPI PIC, i.e. an ACPI PIC hal.dll, although the ACPI PIC hal.dll is not part of the Microsoft Windows XP operating system which is stored as image 22 in storage 20. More specifically, the Microsoft Sysprep utility program 38, in conjunction with image creation program 36, created the clonable operating system image 22 for storage 20 (and subsequent download to client computers 40, 42 and 44) by reading a custom sysprep.inf and command line parameters (in this case—pnp-resealmini) which direct it to eliminate the machine specific system ID and other machine specific information, set the correct video resolution on the target computer, create a special list which will allow the OS image to recognize all possible permutations of mass storage controller hardware, and prepare the OS to launch a "mini-setup" on first boot of the restored image, which will detect the hardware in the target computer and attempt to install any newly supplied drivers. After Sysprep finishes executing, it shuts down the reference computer. Next, a PowerQuest Deploy Center program tool 36 is booted-up and executed in the reference computer, to create the image 22 for storage in storage 20 (and subsequent download to client computers 40, 42 and 44). This hard disk image 22 is usable by any ACPI APIC client computer, i.e. the hard disk image includes the proper hardware abstraction layer ("HAL") for ACPI APIC computers because it was originally created for ACPI APIC computers.

The following describes use of program 30 in each of the client computers 40, 42 and 44 to install the Windows XP operating system in client computers 40, 42 and 44, although program 30 can be used to install other types of operating systems in client computers. When an operator invokes program 30 for the respective client computer 40, 42 or 44, program 30 automatically downloads the Windows XP cloned image 22 (including the ACPI APIC hal.dll), programs 34-37 and file 32 from storage 20 of server 10 to the hard disk of the target client computer in the Prior Art manner, regardless of whether the client computer is ACPI APIC or ACPI PIC type (step 100). Alternately, programs 34-37 and file 32 can be loaded from media 55. Next, program 30 checks file 32 to determine if the client computer is ACPI PIC type (step 102) If so (decision 104, yes branch) as in the case of client computer 44, program 30 automatically replaces the ACPI APIC hal.dll file at the client computer with the ACPI PIC hal.dll file downloaded from storage 20 or loaded from media 55. To perform this replacement at the client computer, program 30 invokes a PartitionMagic program 37 to obtain free space on the hard drive and create a temporary partition. Then, ISCI downloads the operating system image to the staging partition on the hard drive. The ISCI also downloads a DeployCenter program 36 into the staging partition. Then ISCI invokes the DeployCenter program to write the operating system image to the hard drive, resulting in an NTFS partition containing the operating system. Then, program 30 invokes writing tool (such as PQAccess/pqaccd.exe from PowerQuest/Symantec available for both DOS and Linux) 34 to copy the ACPI PIC hal.dll file to the NTFS hard disk partition in the client computer containing the Windows XP operating system, overwriting the existing ACPI APIC hal.dll file at the client computer (step 106). Consequently, the ACPI PIC will become part of the subsequent installation of the Windows XP operating system for the ACPI PIC computer 44. Next, program 30 completes the installation of the Windows XP operating system and associated drivers, utilities and applications as follows. Program 30 determines from file 32 which drivers and utilities are to be downloaded to the client computer from server 10 or loaded from media 55. Next, program 30 copies the drivers and utilities either into the operating system image using the NTFS writing tool, or into the temporary hard drive partition, labeled staging (previously created by program 30 using program 37) for use by the last steps of the build process after program 30 relinquishes control and reboots the client computer into the newly deployed operating system. These final steps include automated changes to operating system configuration, installation of the utilities/applications previously downloaded by program 30, and notification to the end user that the build process is complete. (step 108). After the installation of the Windows XP operating system image (including the ACPI PIC hal.dll) and associated drivers, utilities and applications by program 30, the ACPI PIC client computer 44, will boot normally with the correct HAL and associated Windows Device Manager descriptions and number of interrupt request lines ("IRQs").

Preferably, steps 100, 102, 104 and 106 are performed for an ACPI PIC client computer before an attempt is made to boot up the ACPI PIC client computer, because such an attempt will fail before the ACPI PIC hal.dll file replaces the ACPI APIC hal.dll.

Refer again to decision 104, no branch where the client computer is ACPI APIC as in the case of client computers 40 or 42. In this case, the existing ACPI APIC hal.dll file, which was originally contained in the operating system image 22 (downloaded from storage 20 or loaded from media 55), is correct and usable by client computers 40 or 42, and program 30 will not overwrite it with the ACPI PIC hal.dll file. In this case, program 30 completes the installation by performing the same steps identified above, and then boots-up the operating system in client computer 40 or 42 (step 120).

Program 30 can be loaded into client computers 40, 42, or 44 from a computer readable media 50 such as magnetic tape or disk, optical disk, DVD, etc.

Based on the foregoing, system, method and program product for automatically downloading and installing an operating system and associated drivers, utilities and applications have been disclosed. However, numerous modifications and substitutions can be made without deviating from the scope of the present invention. For example, program 30 can automatically install other types of operating systems to client computers 40, 42 and 44. As another example, steps 102 and 104 can be performed before the operating system is downloaded to the client computer. Therefore, the present invention has been disclosed by way of illustration and not limitation, and reference should be made to the following claims to determine the scope of the present invention.

What is claimed:

1. A method for installing in a first computer of a first type a first version of an operating system, including an operating system kernel and a first hardware abstraction layer to interface the operating system kernel to hardware and/or microcode of the first type of computer, and installing in a second computer of a second type a second version of the operating system, including the operating system kernel and a second hardware abstraction layer to interface the operating system kernel to hardware and/or microcode of the second type of computer, the hardware and/or microcode of the first type of computer being different than the hardware and/or microcode of the second type of computer, the method comprising the steps of:

loading into a hard drive of the second computer an image of the second version of the operating system, and subsequently, booting up in the second computer the second version of the operating system obtained from the image;

loading into a hard drive of the first computer the image of the second version of the operating system;

without booting up in the first computer the second version of the operating system obtained from the image, the first computer automatically determining from a configuration file in the first computer which lists the first type of the first computer, that the second hardware abstraction layer obtained from the image is incompatible with the first computer, and in response, the first computer automatically invoking a writing program, stored in a computer readable storage device of the first computer, to automatically replace in the first computer the second hardware abstraction layer obtained from the image with the first hardware abstraction layer to interface the operating system kernel of the image to the hardware and/or microcode of the first computer; and subsequently booting up in the first computer the first version of the operating system, including the operating system kernel obtained from the image and the first hardware abstraction layer which replaced the second hardware abstraction layer from the image.

2. The method set forth in claim 1 wherein the operating system is Windows XP.

3. The method set forth in claim 1 wherein:

the first type of computer is Advanced Configuration and Power Interface ("ACPI") Programmable Interrupt Controller ("PICS"), and the first hardware abstraction layer interfaces to hardware and/or microcode of the ACPI PIC type; and the second type of computer is ACPI Advanced Programmable Interrupt Controller ("APIC"), and the second hardware abstraction layer interfaces to hardware and/or microcode of the ACPI APIC type.

4. The method set forth in claim 1 wherein:

the step of loading into the hard drive of the second computer the image of the second version of the operating system comprises the step of restoring the image in the second computer to a bootable form of the second version of the operating system; and the step of loading into the hard drive of the first computer the image of the second version of the operating system comprises the step of restoring the image in the first computer to a bootable form of the second version of the operating system.

5. The method set forth in claim 1 further comprising the steps of:

the computer determining a first set of drivers and utilities which are compatible with the first type of computer, and installing the first set of drivers and utilities in the first computer; and the computer determining a second set of drivers and utilities which are compatible with the second type of computer, and installing the second set of drivers and utilities in the second computer.

6. A computer system comprising a first computer of a first type and a second computer of a second type, to install in the first computer a first version of an operating system, including an operating system kernel and a first hardware abstraction layer to interface the operating system kernel to hardware and/or microcode of the first type of computer, and install in the second computer a second version of the operating system including the operating system kernel and a second hardware abstraction layer to interface the operating system kernel to hardware and/or microcode of the second type of computer, the hardware and/or microcode of the first type of computer being different than the hardware and/or microcode of the second type of computer, the computer system comprising:

a first CPU, a first computer readable memory and a first computer-readable hard-drive disk storage in the first computer;

a second CPU, a second computer readable memory and a second computer-readable hard-drive disk storage in the second computer;

first program instructions to load into the second computer-readable hard-drive disk storage of the second computer an image of the second version of the operating system, and subsequently, boot up in the second computer the second version of the operating system obtained from the image;

second program instructions to load into the first computer-readable hard-drive disk storage of the first computer the image of the second version of the operating system;

third program instructions to automatically determine from a configuration file in the first computer, without the second version of the operating system obtained from the image being booted up in the first computer, that the second hardware abstraction layer obtained from the image is incompatible with the first computer, and in response, automatically replace in the first computer the second hardware abstraction layer obtained from the image with the first hardware abstraction layer to interface the operating system kernel of the image to the hardware and/or microcode of the first computer; and fourth program instructions to subsequently boot up in the first computer the first version of the operating system, including the operating system kernel obtained from the image and the first hardware abstraction layer which replaced the second hardware abstraction layer from the image; and wherein the first program instructions are stored on the second computer-readable hard-drive disk storage for execution by the second CPU via the second computer-readable memory; and the second, third and fourth program instructions are stored on the first computer-readable hard-drive disk storage for execution by the first CPU via the first computer readable memory.

7. The computer system set forth in claim 6 wherein the operating system is Windows XP.

8. The computer system set forth in claim 6 wherein:

the first type of computer is Advanced Configuration and Power Interface ("ACPI") Programmable Interrupt Controller ("PICS"), and the first hardware abstraction layer interfaces to hardware and/or microcode of the ACPI PIC type; and the second type of computer is ACPI Advanced Programmable Interrupt Controller ("APIC"), and the second hardware abstraction layer interfaces to hardware and/or microcode of the ACPI APIC type.

9. The computer system set forth in claim 6 wherein:

the first program instructions restore the image of the second version of the operating system to a bootable form in the second computer as part of the loading of the image of the second version of the operating system into the second computer-readable hard-drive disk storage of the second computer; and the second program instructions restore the image of the second version of the operating system to a bootable form in the first computer as part of the loading of the image of the second version of the operating system into the first computer-readable hard-drive disk storage of the first computer.

10. The computer system set forth in claim 6 further comprising:

fifth program instructions to determine a first set of drivers and utilities which are compatible with the first type of computer, and install the first set of drivers and utilities in the first computer; and sixth program instructions to determine a second set of drivers and utilities which are compatible with the second type of computer, and install the second set of drivers and utilities in the second computer; and wherein the fifth program instructions are stored on the first computer-readable hard-drive disk storage for execution by the first CPU via the first computer readable memory; and the sixth program instructions are stored on the second computer-readable hard-drive disk storage for execution by the second CPU via the second computer-readable memory.

11. A computer program product to install in a first computer of a first type a first version of an operating system, including an operating system kernel and a first hardware abstraction layer to interface the operating system kernel to hardware and/or microcode of the first type of computer, and install in a second computer of a second type a second version of the operating system including the operating system kernel and a second hardware abstraction layer to interface the operating system kernel to hardware and/or microcode of the second type of computer, the hardware and/or microcode of the first type of computer being different than the hardware and/or microcode of the second type of computer, the computer program product comprising:

a computer-readable hard-drive disk storage of the first computer;

a computer-readable hard-drive disk storage of the second computer;

first program instructions to load into the computer-readable hard-drive disk storage of the second computer an image of the second version of the operating system, and subsequently, boot up in the second computer the second version of the operating system obtained from the image;

second program instructions to load into the computer-readable hard-drive disk storage of the first computer the image of the second version of the operating system;

third program instructions to automatically determine from a configuration file in the first computer, without the second version of the operating system obtained from the image being booted up in the first computer, that the second hardware abstraction layer obtained from the image is incompatible with the first computer, and in response, automatically replace in the first computer the second hardware abstraction layer obtained from the image with the first hardware abstraction layer to interface the operating system kernel of the image to the hardware and/or microcode of the first computer; and fourth program instructions to subsequently boot up in the first computer the first version of the operating system, including the operating system kernel obtained from the image and the first hardware abstraction layer which replaced the second hardware abstraction layer from the image; and wherein the first program instructions are stored on the computer-readable hard-drive disk storage of the second computer; and the second, third and fourth program instructions are stored on the computer-readable hard-drive disk storage of the first computer.

12. The computer program product set forth in claim 11 wherein the operating system is Windows XP.

13. The computer program product set forth in claim 11 wherein:

the first type of computer is Advanced Configuration and Power Interface ("ACPI") Programmable Interrupt Controller ("PICS"), and the first hardware abstraction layer interfaces to hardware and/or microcode of the ACPI PIC type; and the second type of computer is ACPI Advanced Programmable Interrupt Controller ("API"), and the second hardware abstraction layer interfaces to hardware and/or microcode of the ACPI APIC type.

14. The computer program product set forth in claim 11 wherein:

the first program instructions restore the image of the second version of the operating system to a bootable form in the second computer as part of the loading of the image of the second version of the operating system into the computer-readable hard-drive disk storage of the second computer; and the second program instructions restore the image of the second version of the operating system to a bootable form in the first computer as part of the loading of the image of the second version of the operating system into the computer-readable hard-drive disk storage of the first computer.

15. The computer program product set forth in claim 11 further comprising:

fifth program instructions to determine a first set of drivers and utilities which are compatible with the first type of computer, and install the first set of drivers and utilities in the first computer; and sixth program instructions to determine a second set of drivers and utilities which are compatible with the second type of computer, and install the second set of drivers and utilities in the second computer; and wherein the fifth program instructions are stored on the computer-readable hard-drive disk storage of the first computer; and the sixth program instructions are stored on the computer-readable hard-drive disk storage of the second computer.

* * * * *